Patented Oct. 13, 1931

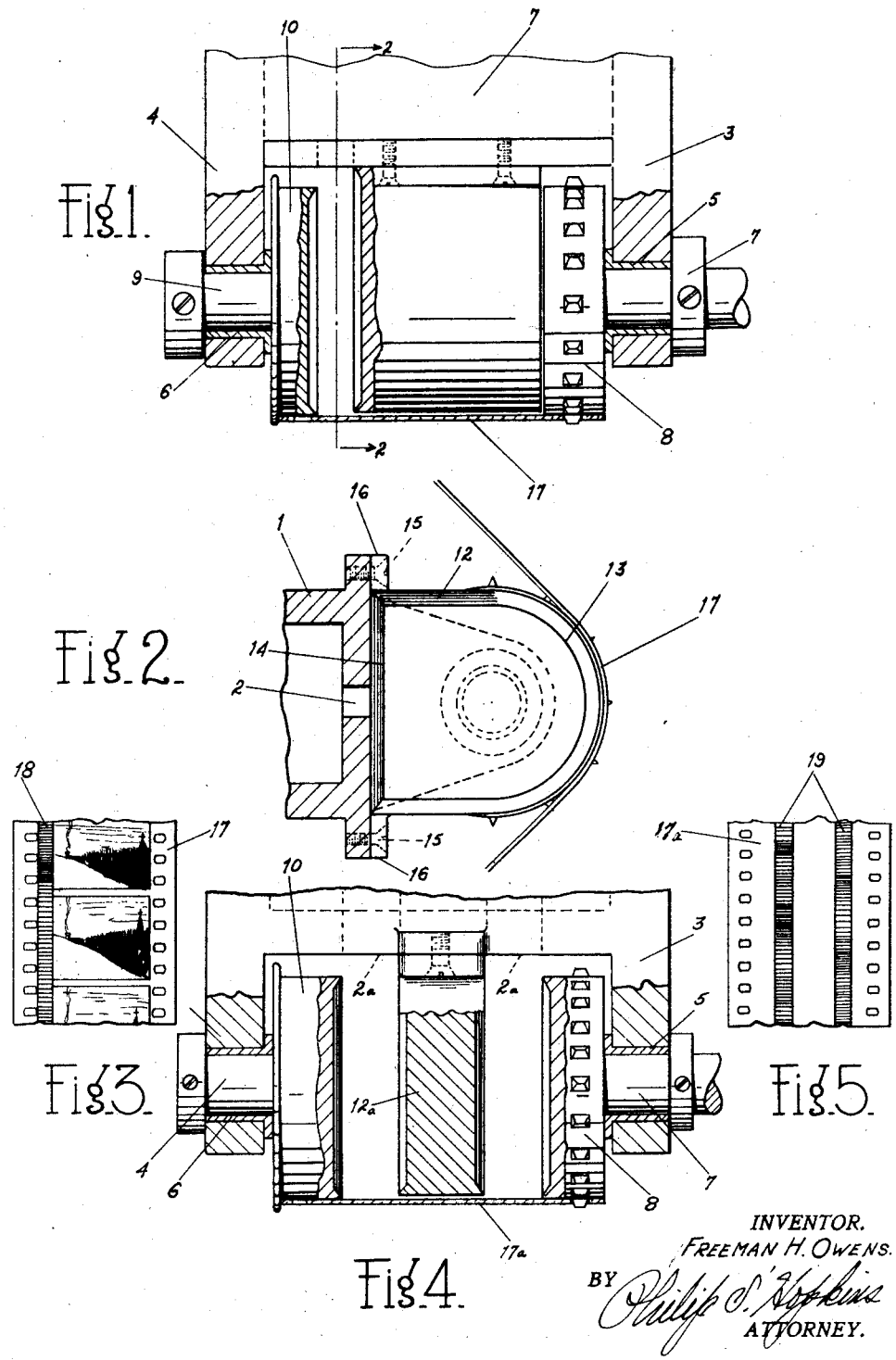

1,827,206

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

FILM SUPPORT FOR PHOTOGRAPHIC APPARATUS

Application filed February 18, 1930. Serial No. 429,324.

This invention relates to improvements in film supports for photographic apparatus, the primary object of the invention being to provide an improved device of this character which is particularly suited for use in connection with the traveling films of sound recording and reproducing devices, and which device includes a stationary supporting element disposed between a pair of rotating elements in such manner as to permit the passage of light between said stationary element and one or both of the rotating elements.

Other objects and advantages of the invention will appear as the description proceeds.

In the drawings accompanying this specification,

Figure 1 is a sectional plan view of a film supporting device embodying the features of the present invention, the support being shown broken away from the recording or reproducing apparatus.

Figure 2 is a transverse sectional view taken on the line 2—2 of Figure 1 and looking in the direction of the arrows.

Figure 3 is a fragmentary view of a film illustrating a sound record such as may be reproduced or recorded by the use of the device shown in Figures 1 and 2.

Figure 4 is a view similar to Figure 1, but illustrating the device adapted for reproducing or recording dual sound records, and Figure 5 is a fragmentary view of a film illustrating a pair of sound records such as may be reproduced or recorded by the use of the device shown in Figure 4.

Referring to the drawings, 1 designates a portion of a housing or tube carrying the usual optical slit system (not shown), the outer end wall of which housing has formed therein an opening 2, (Figures 1 and 2) for the passage of light from the optical system. Integral with or attached to said housing are a pair of forwardly extending side brackets 3 and 4 respectively, said brackets carrying journal bearings 5 and 6 in alignment with each other. In the bearing 5 is mounted for rotation a driving shaft 7, on the end of which is secured a short film driving sprocket 8, said sprocket lying adjacent to the inner side of the bracket 3. Mounted for rotation in the bearing 6 is a stud shaft 9, carrying at its inner end a short, flanged roller 10 of the same diameter as the sprocket 8, the opposing ends of said roller and sprocket being a considerable distance apart.

In Figures 1 and 2 is shown a bridge member 12 disposed between the sprocket 8 and the roller 10, said member having a curved or arc-shaped front wall 13 and a rear wall 14 parallel with the end wall of the housing 1, to which it is attached by means of screws 15 passing through flanges 16 formed on said rear wall, said screws being threaded into similar flanges carried by the end wall of the housing 1. The bridge member is disposed with one end thereof contiguous to but not in contact with the end of the sprocket 8, the length of said bridge member being such that a space is left between its opposite end and the end of the roller 10, said space corresponding in width with the length of the opening 2 of the housing 1 and being in alignment with said opening thereby to permit passage of light from the housing and through said space to a film 17 supported on the sprocket and roller thereby to produce on said film the sound record 18, or to reproduce a similar sound record carried by the film. The curvature of the wall 13 is concentric with that of the sprocket 8 and roller 10, but is of shorter radius, whereby the surface of said wall lies in an arc within that of said roller and sprocket, so that said surface is normally out of actual contact with the film 17 as it passes over the sprocket and roller.

In the form shown in Figure 4, the device is adapted for dual recording or reproduction; that is to say, the device is constructed to accommodate a film on which two parallel sound records are to be recorded or having two sound records to be reproduced. In this form the housing 1 is provided with two light outlet openings 2a and the bridge member 12a is shorter than the member 12 above described and is centrally located so as to leave a space for the passage of light between it and the sprocket as well as between it and the roller, said spaces being in alignment with the respective openings 2a to permit passage of light to the film 17a thereby to produce thereon the dual sound records 19 or to reproduce such sound records.

It is believed that the operation of the device will be readily understood. The film is engaged by the sprocket, the opposite edge of the film resting on the roller 10, the flange of which resists any tendency of the film to move laterally to the left of Figure 1. The stationary curved wall 13 is just far enough away from the film to avoid friction when the film is traveling by reason of the pull of the sprocket.

I claim:

1. A support for traveling films, comprising a pair of axially aligned movable members, one of said members being adapted to engage a film and cause the same to travel over the other member, and a stationary member disposed between said movable members and spaced therefrom to permit the passage of light to said film between said stationary and movable members and on each side of said stationary member.

2. A support for traveling films, comprising a pair of axially aligned movable members, one of said members being adapted to engage a film and cause the same to travel over the other member, and a stationary member disposed between said movable members and spaced therefrom to permit the passage of light to said film between said stationary and movable members and on each side of said stationary members, said stationary member being normally out of contact with said film.

3. A support for traveling films, comprising a rotatable sprocket adapted to engage a film near one edge thereof and cause traveling movement of said film, a member mounted for rotation in axial alignment with said sprocket and adapted to support the film at its opposite edge, and a stationary member disposed between said sprocket and rotatable member, said stationary member being normally out of contact with said film and dividing the space between said members into two light passages to said film.

4. A support for traveling films, comprising a rotatable sprocket adapted to engage a film near one edge thereof and cause traveling movement of said film, a roller mounted for rotation in alignment with said sprocket and adapted to support the film at its opposite edge, and a stationary member disposed between said sprocket and rotatable member, said stationary member having a curved surface concentric with but of shorter radius than said roller and sprocket.

In testimony whereof, I affix my signature.

FREEMAN H. OWENS.